United States Patent

[11] 3,633,583

[72] Inventor Meyer Fishbein
12020 Saltair Place, Los Angeles, Calif. 90049
[21] Appl. No. 852,226
[22] Filed Aug. 22, 1969
[45] Patented Jan. 11, 1972

[54] ORTHOPEDIC SINGLE-BLADE BONE CUTTER
5 Claims, 10 Drawing Figs.
[52] U.S. Cl.................................................. 128/305, 408/227
[51] Int. Cl.................................................. A61b 17/32
[50] Field of Search............................................. 128/305, 92 E; 77/72, 67, 58, 73.5; 144/219; 15/236 R

[56] References Cited
UNITED STATES PATENTS
318,994 6/1885 Lake .......................... 77/72 UX
2,703,996 3/1955 Reynolds et al. ............. 15/236 R UX
1,774,567 9/1930 Raphael ...................... 15/236 R FOREIGN PATENTS
1,031,888 3/1953 France ........................ 128/305
842,133 7/1960 Great Britain................. 408/227

Primary Examiner—Channing L. Pace
Attorney—Forrest J. Lilly

ABSTRACT: A surgical rotary bone cutter having a rotary cutter head shaped as a substantially hemispherical surface of revolution coaxial with its axis of rotation and being longitudinally and medially split into two halves by a diametrical slot intersecting the axis of rotation. A single flat blade having a longitudinally curved edge is positioned in the slot and projects marginally beyond said surface of revolution. The blade edge is oppositely beveled on opposite sides of its midpoint to form two longitudinally curved rotatable shearing edges. A channel for conveying cuttings from the shearing edges is formed in the head alongside each shear edge. The cutter head may be formed as a concave or a convex hemispherical surface.

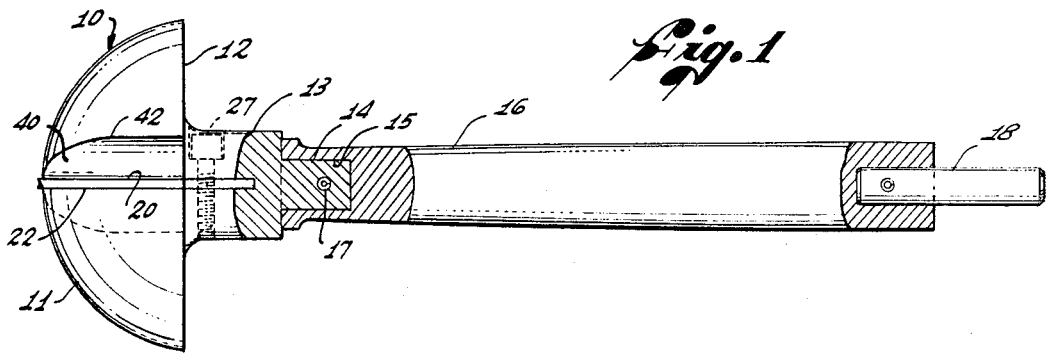
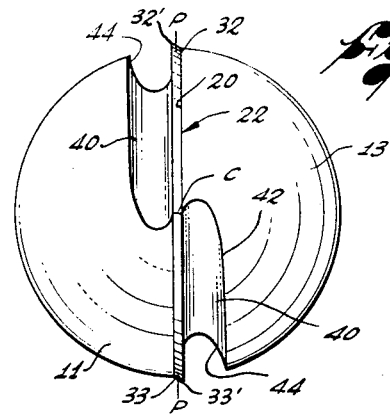
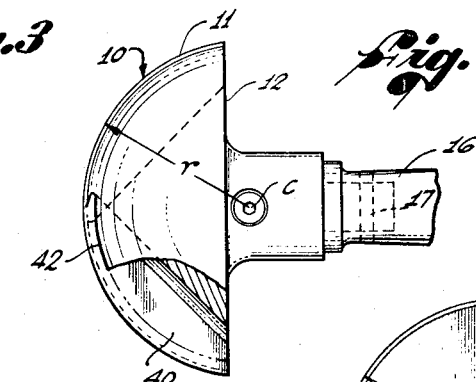
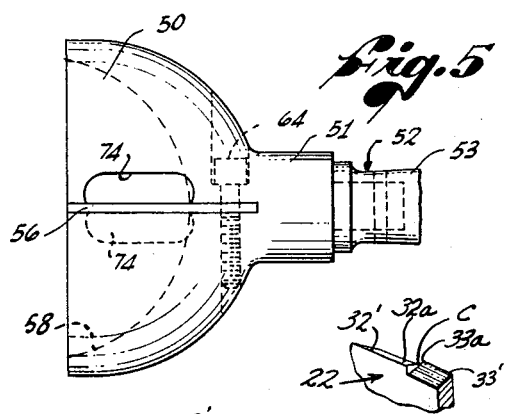
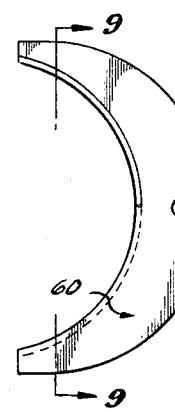
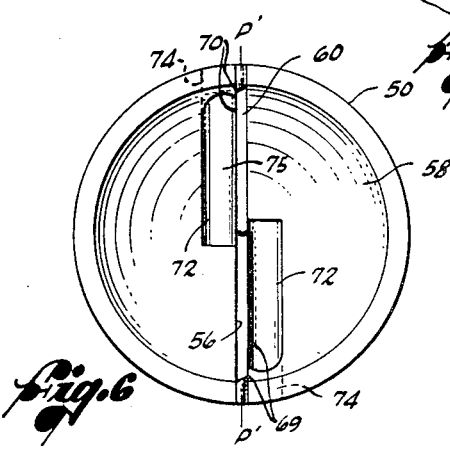
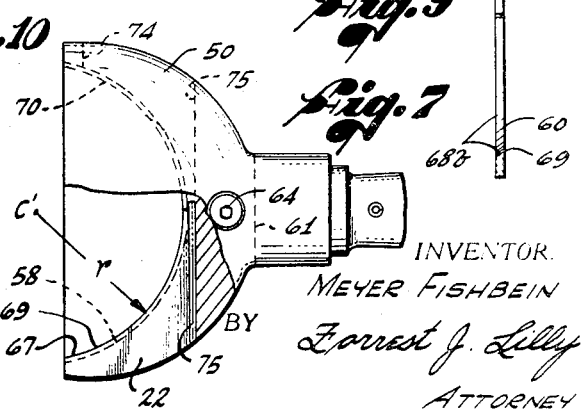
INVENTOR.
MEYER FISHBEIN
BY Forrest J. Lilly
ATTORNEY

ORTHOPEDIC SINGLE-BLADE BONE CUTTER

1. Field of the Invention

This invention relates generally to rotary bone cutters having the ability to round the ends of bones so as to provide either a hemispherical head thereon, or socket therein.

2. Description of the Prior Art

Bones requiring exterior rounding include the femur or the ends of phalanges of the hand or foot, as is often required following arthroplasty resulting from the condition of rheumatoid arthritis. An example of rounding of a cavity is in reshaping the acetabulum of the hip, one step in the surgical procedure called cup arthroplasty, following destruction of the cartilage and bone due to arthritis.

Background of the Invention

In the part it has been difficult to obtain fusion of the proximal or distal interphalangeal joint by removing the articular cartilage and using crossed Kirschner wires for internal fixation. It was also difficult to obtain the desired angle of fusion by the older techniques which removed the articular cartilage and bone by means of a surgical tool called the Rongeur. The Rongeur is essentially a cutting tool in the shape and form of a pair of pliers and when used to remove the articular cartilage or bone, leaves sharp edges of bone and frequently causes splitting of the bone or phalanx along its longitudinal axis.

Some attempts at filing the raw edges of bone using a hand file have been made, with results that are not always too satisfactory and often time consuming, because of the difficulty of manipulating the file in rather a restricted area; results which are often not to the advantage of the patient or the doctor.

More recently these same surgical procedures are being performed with power tools driving reamers that are essentially rotary files, with a multiplicity of radially disposed cutting edges or teeth.

Several problems have been encountered with this type of rotary file, which are:

1. Loading of the cutter with moist bone chips and cartilage, requiring irrigation or frequent stopping of the cutter in order to clean out the V-grooves between the multiple teeth of the cutter.
2. Excessive torque requirement when all the "teeth" of the cutter are engaged in the bone.
3. High cost of manufacture because of the multiplicity of cutting edges, or "teeth," and high cost of maintenance (sharpening), for the same reason.
4. Heavy weight, with cutting teeth and body being made of one piece of steel.

The present invention affords satisfactory solutions to these problems.

Brief Description of the Invention

The bone cutter of the invention comprises a strong but lightweight rotary head which is diametrically split to receive a single, flat, transversely positioned scraper blade. The bone scraping or shearing edge of the blade is formed either with a convex or concave curvature, as the case may be, and this edge projects marginally, i.e., just slightly beyond a correspondingly curved substantially hemispherical surface of the cutter head. Formed in the head, alongside the blade, are grooves or troughs to receive and carry away the bone and cartilage scrapings out of the reamer during rotation without the need of irrigation.

Brief Description of the Drawing

FIG. 1 is a side elevational view of one form of cutter in accordance with the invention, with parts broken away;

FIG. 2 is a side elevation of the cutter, in a position at 90° from that of FIG. 1, parts being broken away;

FIG. 3 is a front elevational view of the cutter, as seen from the left looking towards FIG. 2;

FIG. 4 if a side elevational view of the blade of the cutter of FIGS. 1-3;

FIG. 5 is a side elevational view of another form of the invention, the driving shank being broken away;

FIG. 6 is a front elevational view of the cutter looking toward the cutter of FIG. 5 from the left;

FIG. 7 is a side elevational view of the cutter, parts being broken away, and the view being taken at 90° from that of FIG. 5;

FIG. 8 is a side elevational view of the cutter blade of FIGS. 5-7;

FIG. 9 is a view of the cutter blade of FIGS. 5-7, as seen in section on line 9—9 of FIG. 8; and FIG. 10 is a fragmentary perspective of a midportion of the cutter blade of the invention.

Description of Preferred Embodiments

Referring first to the acetabulum type of cutter or reamer of FIGS. 1-4, the head, designated generally at 10, and which preferably is of a strong, light material such as an aluminum alloy, is of substantially a hemispherical form with a convex front surface of revolution 11, and a flat rearward surface 12. A hub 13 with a reduced coaxial coupling pin 14 projects axially from surface 12. Pin 14 is received in a socket 15 in the end of a somewhat tapered shank 16, and is connected to the latter by a roll pin 17. Shank 16 has a coupling pin 18 at its opposite end adapting it for coupling to a rotary driver, preferably an electric surgical drill.

The center of curvature C of the convex front face of the head 10 is preferably spaced somewhat rearwardly of the rearward head surface 12, so that while the head can be described as generally or substantially hemispherical, its preferred form is just a trifle under a full 180° hemisphere.

The hemispherical head 10, and the hub 13, for approximately three-fourths of the depth of the latter, are split longitudinally on a diametrical plane, forming a diametrical slot 20, adapted to receive a flat, tool steel blade 22. The blade 22 is shaped in general resemblance to the head and hub, its cutting edge being convex in form, with a shank 24 extending from its base edge 25, so as to seat into the bottom of the slot 20. The hub is drilled and tapped on the axis of the center C to receive an Allen screw 27, and the blade 22 is drilled as at 28 to receive and be positioned accurately by this screw 27. Tightening of the screw 27 clamps the split head and knife in solid assembly. The blade may be quickly removed and replaced by taking out and replacing the screw 27.

The radius $r$ of the convex blade edge 30, drawn from center C, is slightly greater than that of the convex head surface 11, so that the blade edge projects a slight marginal distance beyond the latter for proper cutting, the cutting depth being controlled by the proximity of the hemispherical surface 11. The blade edge is oppositely beveled on opposite sides of its center or midpoint C to give a suitable clearance angle for each half of the blade; as designated at 32 and 33, and so as to form two shear or scraper edges 32' and 33', respectively. Rotation of the head spins the two convex scraper edges against the cartilage and/or bone to take a fine hemispherical shear type cut therein, which may be progressively deepened as desired. The beveled faces of the two half portions of the blade meet at the midpoint or axis C, in two angular end edges 32a and 33a which intersect at angles opposite to one another at the midpoint of the blade (FIG. 10). This formation assures clean shearing in the center region of the socket to be formed. The blade produces fine cuttings or scrapings, which are disposed of as presently described. It will be particularly noted that the curved blade edges 32' and 33' move normally to the bone, and depth of cut is controlled to be uniform along the entire blade edges by the uniform projection distance thereof beyond the hemispherical guide surface 11. Maximized cutting rate can be achieved with projection distance small enough to avoid gouging or chatter.

Preferably, the blade slot 20 is bisected by a diametrical plane P of the head, so that the two blade edges 32' and 33' are equidistantly positioned, by distances equal to the half-thickness of the blade, ahead of this diametrical plane. Maximum uniformity of cutting by the two oppositely beveled half-lengths of the blade is thereby achieved, and a highly uniform hemispherical socket obtained.

Alongside each knife edge 32' and 33', the head 10 is formed with a trough, passage, or groove 40. As will be seen, each of these grooves extends from a point just beyond the midpoint of the blade, back past said midpoint and angularly down or back alongside the opposite half of the blade. The groove opens to the blade on one side, and intersects the convex surface 11 on the other, in a curved line 42, opening through a discharge notch 44 in the back surface 12 of the head, adjacent its periphery.

It will be seen, especially from FIG. 3, that the groove 40, positioned immediately in advance of the scraping edge of the blade, receives and gathers scrapings and cuttings from the blade, and that these will pack into, flow along, and be continuously discharged from the groove 40 and its exit notch in the back of the head 10 during the operation of the drill.

Irrigation is not required, and since the cuttings and scrapings pass continuously out of the cutter and the bone cavity being formed, there is no need for the surgeon to stop his work to clean out the cutter.

The female cutter, for rounding the end of the femur, or other bones, is shown in FIGS. 5 et seq. The head 50 in this case is in the form of a cup, with a hub 51 at the back, and a coupling 52 to a drill shank 53 only fragmentarily shown since these last mentioned parts can be like those of the embodiment already shown.

The head or cup 50 is longitudinally medially split, having a diametrical slot 56, bisected by a diametrical plane P' of the cup through the centerline thereof, extending, in this case, to the junction of the back of the cup with the hub 51. The cup preferably has a generally or substantially hemispherical interior surface 58, preferably, in this case, having a radius $r_1$ whose center C' is on the centerline of the cup, and is spaced a short distance from its front end, as shown.

A flat, crescentlike blade 60 is seated in slot 56, and is in general conformity to the cross section of the cup. It has a flat seat 61 at the bottom, seating at the bottom of the slot 56.

An Allen screw 64 in the two halves of the cup, at the bottom thereof, passes through a hole 65 in the blade, and clamps the two halves of the cup and the blade in solid assembly.

The concave blade edge 68 projects above the concave surface 58 of the cup a suitable distance for taking a proper cut or "chip," and is beveled in opposite directions on opposite sides of its midpoint, as at 68a and 68b, to provide two scraper or shear edges 69 and 70. The two halves of the blade edge thus have proper clearance angles for cutting, and since these are symmetrically placed relative to the centerline of the cutter, a uniform, ball end can be formed on the bone, such as can be mated with a uniform hemispherical cavity.

To receive and carry away cartilage and bone cuttings or scrapings, the cup is formed with two grooves or passages 72, immediately adjacent the faces of the blade halves outlined by the knife edges 69 and 70. These grooves or passages are slotted through the sidewall of the cup, and are closed on one side by the blades. They they terminate in exit ports 74 opening through the side of the cup. Each such slot extends downward to a bottom surface 75 which is at substantially right angles to the centerline of the cup, and is somewhat deeper than the cup so that it can receive scrapings from the very bottom of the cup. The radially inner ends of these grooves preferably extend past one another, as shown in FIG. 6.

This form of the reamer has the same advantages as that first described, carrying away scrapings continuously by way of the passages 72, without necessity of irrigation, and without the necessity of periodic interruptions of the surgery to clean the cutter.

The cutters of the invention are of course susceptible to various changes in design, structure and arrangement without departing from its broad scope.

I claim:

1. A surgical rotary bone cutter comprising:
    a rotary cutter head having a substantially hemispherical surface of revolution coaxial with its axis of rotation, said head being longitudinally and medially spit into two halves by a diametrical slot intersecting its axis of rotation; and
    a single flat blade positioned in said slot and formed with a longitudinally curved edge positioned to project marginally beyond said surface of revolution;
    said blade edge being oppositely beveled on opposite sides of its midpoint to form two longitudinally curved rotatable shear edges, each formed with a clearance angle;
    said head having sunk therein, below said surface of revolution, and alongside each of said shear edges, a channel for conveying cuttings from said shearing edges, each of said channels beginning at a point located ahead of the midpoint of the blade and extending from there past said midpoint and along its corresponding shear edge to a cuttings discharge outlet, so as to assure reception of cuttings from the center area of the sockets and to convey these cuttings away and thereby avoid packing of cuttings between the bottom-center region of the socket and the center portions of the shear edges.

2. The subject matter of claim 1 wherein said head is substantially hemispherical, and wherein the discharge outlet of said cuttings channel opens through the rearward side of and inside the perimeter of said hemispherical head, whereby to convey away all cuttings from the socket and prevent packing of cuttings between the cutter head and the socket.

3. A surgical rotary bone cutter comprising:
    a rotary cutter head having a substantially hemispherical surface of revolution coaxial with its axis of rotation, said head being longitudinally and medially split into two halves by a diametrical slot intersecting its axis of rotation; and,
    a single flat blade positioned in said slot and formed with a longitudinally curved edge positioned to project marginally beyond said surface of revolution;
    said blade edge being oppositely beveled on opposite sides of its midpoint to form two longitudinally curved rotatable shear edges, each formed with a clearance angle;
    said oppositely beveled portions of said blade edge meeting at the midpoint of the blade, at the axis of rotation of the cutter, to terminate in two angular end edges which intersect at angles opposite to one another at said axis of revolution.

4. A surgical cutter as defined in claim 1, wherein said surface of revolution is in the form of a substantially hemispherical cavity, and said shearing edges are on a concave curve lying inside said surface of said hemispherical cavity.

5. The surgical cutter of claim 4, wherein said head is in the form of a cup having merging side and bottom wall portions with said substantially hemispherical cavity formed therein, and including a pair of grooves sunk in the interior surface of said wall portions, alongside said shearing edges, and terminating in exit slots extending through said wall portions of said cup.

* * * * *